United States Patent [19]

Hodgkins et al.

[11] Patent Number: 4,938,036
[45] Date of Patent: Jul. 3, 1990

[54] COMBINATION AIR CONDITIONING ACCUMULATOR AND FUEL COOLER

[75] Inventors: David H. Hodgkins, Granby; John J. Foley, Bozrah, both of Conn.

[73] Assignee: Stanadyne Automotive Corp., Windsor, Conn.

[21] Appl. No.: 318,958

[22] Filed: Mar. 6, 1989

[51] Int. Cl.$^5$ ............................................. F02M 53/00
[52] U.S. Cl. ..................................... 62/323.1; 62/503; 123/541; 165/154
[58] Field of Search ..................... 123/541; 62/83, 503, 62/323.1; 165/154

[56] References Cited

U.S. PATENT DOCUMENTS

| | | | |
|---|---|---|---|
| 1,214,784 | 2/1917 | Hiatt | 165/154 |
| 1,816,307 | 7/1931 | Von Reis | 165/154 X |
| 2,004,252 | 6/1935 | Sorensen | 165/154 X |
| 2,343,049 | 2/1944 | Fassinger, Sr. | 165/154 |
| 4,155,337 | 5/1979 | Hensley | 123/541 |
| 4,155,337 | 5/1979 | Hensley | 123/541 |
| 4,285,316 | 8/1981 | Stolz et al. | 123/514 |
| 4,345,644 | 8/1982 | Dankowski | 165/154 |
| 4,790,145 | 12/1988 | Thompson et al. | 123/541 X |

FOREIGN PATENT DOCUMENTS 3330250  3/1984  Fed. Rep. of Germany ...... 123/541
0128653  10/1980  Japan .................................. 123/541

Primary Examiner—William E. Tapolcai
Attorney, Agent, or Firm—Chilton, Alix & Van Kirk

[57] ABSTRACT

A combination air conditioning accumulator and fuel cooler unit comprises an enclosed housing having fuel inlet and outlets, and refrigerant inlets and outlets. Liquid refrigerant entering the unit is evaporated by means of heat exchange with hotter fuel in the unit. Preferably, the housing is in the form of an elongated cylinder and the fuel flow path is coaxial with the housing longitudinal axis. The heat exchanger includes a substantially cylindrical wall within which the fuel flows, and an outer, finned portion in contact with the flow of refrigerant. A desiccant is provided between the refrigerant flow path and the housing, to serve both insulating and moisture-removing functions. A stand pipe is provided to prevent unevaporated freon from exiting and returning in liquid form to the air conditioning compressor. The housing includes end plug members in which the fuel and refrigerant inlets and outlets are formed, the housing being attached to the plug members by crimp connections. The fuel flow path is preferably defined by threaded connectors in the end plugs and a stem pipe secured to the threaded connectors along the housing axis.

19 Claims, 3 Drawing Sheets

COMBINATION AIR CONDITIONING ACCUMULATOR AND FUEL COOLER

BACKGROUND OF THE INVENTION

The present invention relates to automotive systems, and more particularly, to various fluid flow and heat exchange systems associated with a fuel injected engine-powered vehicle.

It is common in fuel injection systems and even some carbureted fuel systems, that a portion of the fuel drawn from the fuel tank for delivery into the engine, be recirculated back to the fuel tank as a consequence of partial consumption by the engine. In gasoline fuel injected systems, this fuel is typically at a pressure of about 40 psi and, during its travel from the tank to the pressure regulator and back to the tank, experiences approximately 25–80 degree F. rise in temperature. During continuous operation of the engine, a continuous flow of recirculating fuel returning to the tank, causes the average temperature of the fuel in the tank to rise considerably. Typically, this heat resulting from the recirculating flow of fuel, is not utilized in any other system within the vehicle, and thus respresents a substantial net energy loss.

SUMMARY OF THE INVENTION

It is an object of the present invention to capture at least some of the heat associated with the temperature rise of the fuel recirculation line of a fuel injection system, for use as a source of heat in a different system associated with the same vehicle.

It is a more particular objective of the present invention that the heat from the recirculating fuel line be utilized as a heat source in the vehicle air conditioning system.

It is a further object of the invention, to provide a combination air conditioning accumulator (receiver) and fuel cooler, in which the dual objectives of cooling the recirculating fuel and evaporating any residual liquid refrigerant prior to delivery to the compressor of the air conditioning system are achieved.

In one implementation of the invention, a heat exchanger unit is provided for vertical installation in the fuel line of an internal combustion system. The unit comprises an enclosed housing having a fuel inlet and a fuel outlet, and a second fluid inlet and second fluid outlet. A fuel flow path is defined within the housing for confining a flow of hot fuel from the fuel inlet to the fuel outlet. A finned heat exchanger is located within the housing in contact with the confined flow of fuel, for drawing heat away from the fuel. A second flow path is defined from the second fluid flow inlet to the second fluid flow outlet, the second path passing along the heat exchanges so that the second fluid absorbs the heat from the fuel flow, thereby reducing the fuel temperature.

In a more particular implementation, a combination air conditioning accumulator and fuel cooler unit comprises an enclosed housing having fuel inlet and outlets, and refrigerant inlets and outlets. Liquid refrigerant entering the unit is evaporated by means of heat exchange with hotter fuel in the unit, whereby the fuel is cooled before leaving the unit. Preferably, the housing includes an elongated, cylindrical casing and the fuel flow path is coaxial with the longitudinal axis of the casing. The heat exchanger preferably includes a substantially cyclindrical wall within which the fuel flows, and an outer, finned portion in contact with the flow of refrigerant. A desiccant is provided between the refrigerant flow path and the casing, to serve both insulating and moisture-removing functions. Preferably, the housing includes end plug members in which the fuel and refrigerent inlets and outlets are formed. The casing is preferably attached to the plug members by crimp connections. The fuel flow path is preferably defined by threaded connectors in the end plugs and a stem pipe secured to the threaded connectors along the housing axis.

DESCRIPTION OF THE PREFERRED EMBODIMENT

Figure 1:
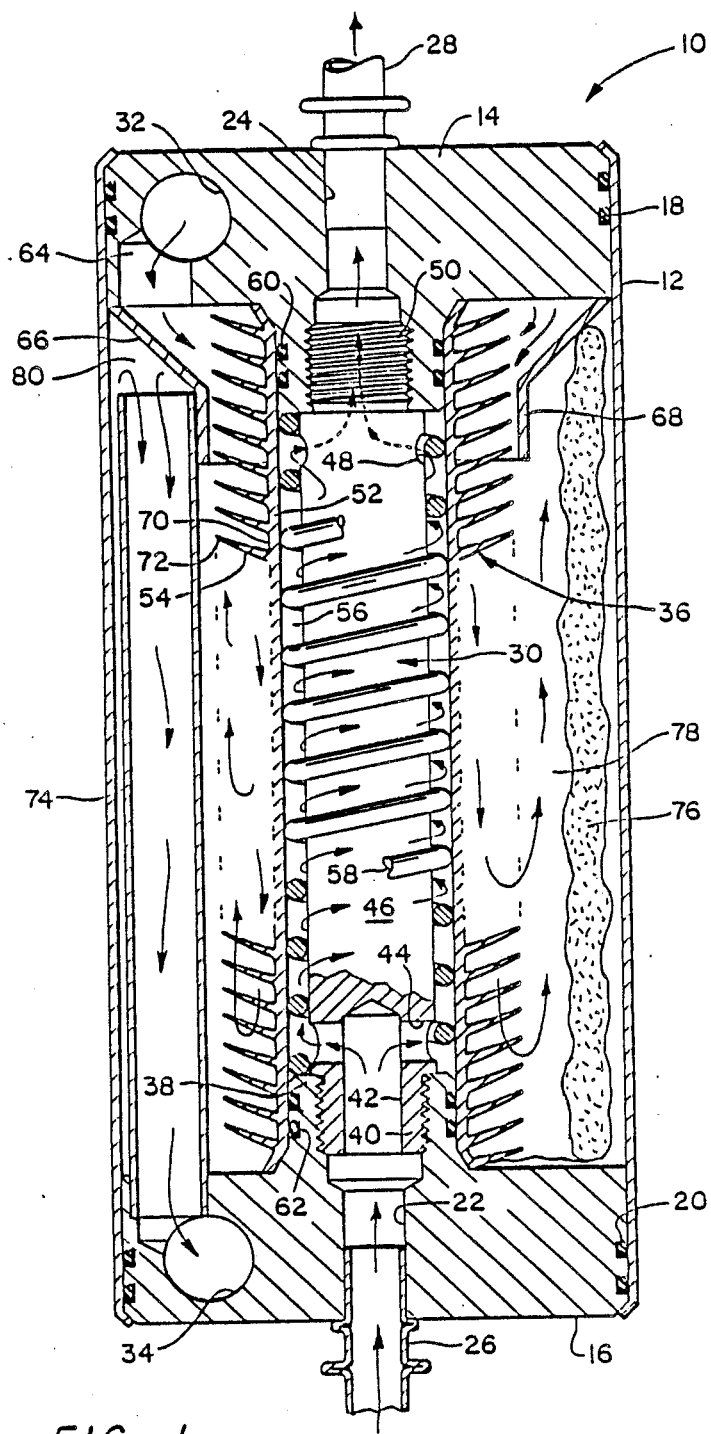
FIG. 1 is a sectioned elevation view of a combination air conditioning accumulator and fuel cooler in accordance with the invention.

FIG. 1 shows a combination air conditioning accumulator and fuel cooler unit 10 having a vertically oriented housing defined by a substantially cylindrical casing 12 with upper and lower end plugs 14, 16. Upper and lower O-ring seals 18, 20 are interposed between grooved circumferential surfaces of the upper and lower end plugs 14, 16, respectively, and respective inner surfaces of the casing 12. The exterior edges of the end plugs 14, 16 are chamfered, whereby the upper and lower edges of the casing 12 may be bent over or crimped, to retain the end plugs.

The lower end plug 16 includes an axially aligned fuel inlet bore 22, and the upper plug 14 includes an axially aligned fuel outlet bore 24. Fuel inlet and outlet fittings 26, 28, are secured, preferably by interference fit, into the bores 22, 24, respectively. A central fuel flow tube 30, preferably in the form of a stem pipe, is axially aligned with and fluidly connected between the inlet and outlet bores 22, 24, such that in a manner to be described more fully below, hot fuel may enter the inlet fitting 26, pass through or along the stem pipe 30, and exit the unit through outlet fitting 28.

In the illustrated embodiment, heat from the flow of fuel is transferred to a second fluid, such as Freon refrigerant associated with the air conditioning system of the same vehicle. For this purpose, a Freon inlet 32 is formed in the upper end plug 14, and a Freon outlet 34 is formed in the lower end plug 16. The inlet 32 and outlet 34 are radially spaced from the bores 22, 24. Any liquid form of Freon entering the unit 10 through inlet 32 willl be evaporated, and any moisture will be extracted, prior to the refrigerant exiting the unit through Freon outlet 34.

To accomplish this evaporation, a heat exchanger 36 is connected between the upper and lower end plugs 14, 16. Each end plug includes an internally threaded neck portion 38 projecting axially inwardly. A threaded nipple 40 projects axially at each end of the stem pipe 30, and is threaded to the respective neck 38. Each nipple 40 has a longitudinal, axial bore 42 in fluid communication with the respective inlet or outlet bore 22, 24. Substantially immediately inward of the nipples 40, each bore 42 terminates axially and communicates with transverse holes 44, 48. The axially central portion of the stem pipe 30 is in the form of a solid rod 46.

The heat exchanger 36 has an inner, cylindrical wall 52 in part defining a fuel flow path and a multiplicity of annular, obliquely upwardly oriented, projecting fins 54. The fuel flow and specially adapted heat exchange structure 52,54 are preferably formed integrally, as shown, to maximize the intimate contact therebetween. A flow annulus 56 is thereby defined between the cylindrical wall 52 and the stem pipe 30. In particular, hot fuel flows through bore 22, 42, 44, through annulus 56, into bore 48, and out bore 24. Preferably, a heating coil 58 in the form of a substantially solid wire is coiled around the rod portion 46 of stem pipe 30, the coil 58 being in contact on its inner surface with the rod portion 46 and on its outer surface with the cylindrical wall 52. The coil not only conducts heat, but also imparts a helical flow path to the fuel.

The cylindrical wall 52 extends over the neck 38 of each end plug 14, 16, and is crimped thereto so as to trap and preload respective upper and lower seals 60, 62 located in grooves on the respective neck outer surfaces. It can be thus appreciated that the end plugs 14, 16 are substantially rigidly secured between the axial ends of the cylindrical wall 52, and the crimped axial end of the casing 12.

A Freon inlet channel 64 is in fluid communication with the Freon inlet 32, and leads to a funnel 66 having a lower, substantially cyclindrical skirt portion 68, which guides the Freon downwardly and radially inwardly onto the fins 54 at the upper end of the heat exchanger 36. The obliquely upward orientation of the fins, and their annular configuration, traps Freon that may be in liquid phase at the base 70 of the fins. This is the hottest portion of the heat exchanger exterior, due to the contact of the cylindrical wall portion 52 with the hot fuel in the annulus 56 and the coils 58. The Freon thereby evaporates and is directed radially outwardly and upward toward the upper portion of the casing 12, as indicated by the directed arrows.

As the Freon moves upwardly and radially outwardly past the tips 72 of the fins 54, the evaporated Freon passes upwardly through a plenum 78, the outer surface of which is defined by a substantially annular padding of desiccant material 76 extending longitudinally between upper and lower end plugs 14, 16. The desiccant serves not only to remove moisture from the Freon, but also provides insulation to prevent condensation of the gaseous Freon as it rises toward the collection zone 80 defined between the outer surface of funnel 66 and the inner surface of the casing 12. A tube or other channel structure 74 extending from the collection region 80 to the Freon outlet 34, provides a conduit by which the evaporated Freon is extracted from the unit 10. The channel 74 acts as a stand pipe to prevent unevaporated fuel from returning as a solid liquid to the compressor of the refrigeration system.

Figure 2:
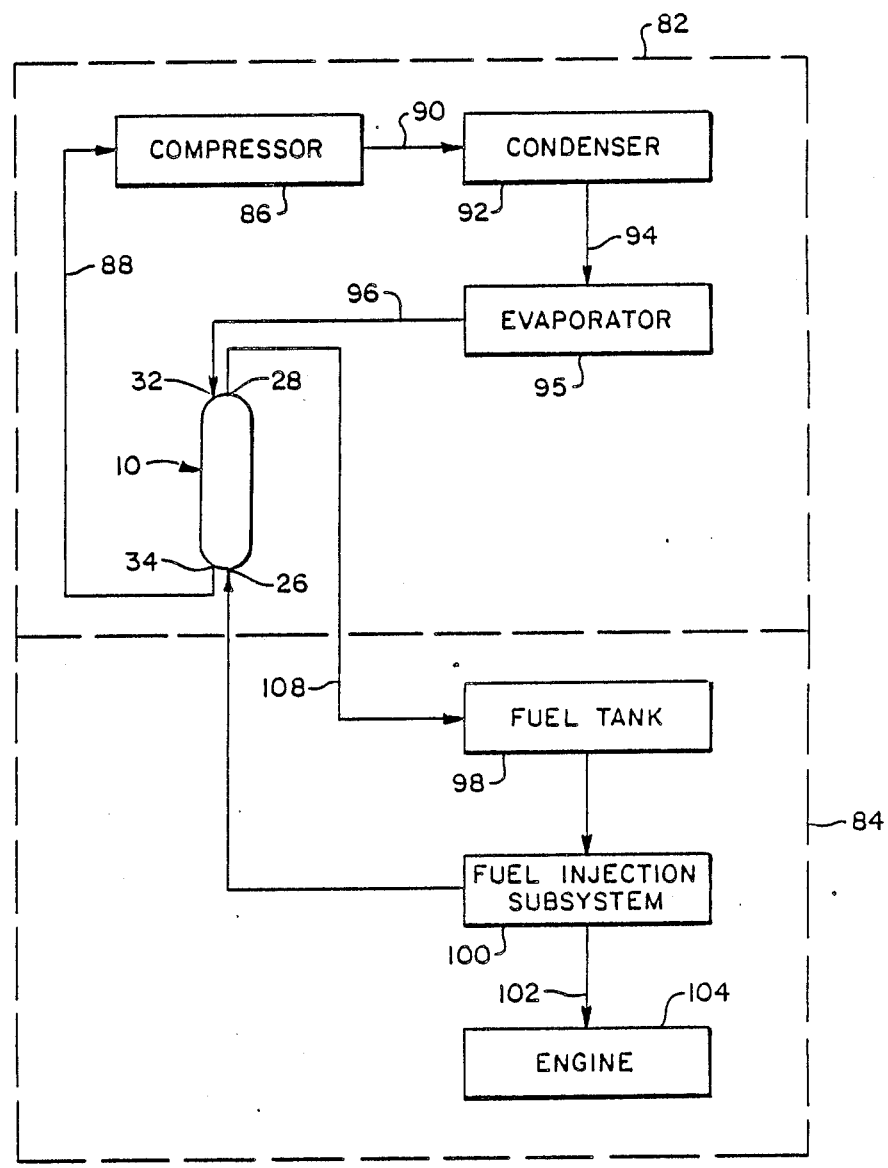
FIG. 2 is a schematic representation of the manner in which the unit shown in FIG. 1 would be connected between the fuel system and the air conditioning system of a diesel powered vehicle.

FIG. 2 shows a typical location of the combination accumulator and fuel cooler unit 10 in fluid communication with both the air conditioning system 82 and the fuel supply system 84 of a diesel powered vehichle. The air conditioning system 82 typically includes a compressor 86 which draws low pressure Freon gas through low pressure line 88 and delivers high pressure Freon gas through line 90 to condenser 92. In the condensor 92, the high pressure Freon gas is converted into high pressure Freon liquid and delivered through line 94 to evaporator 95. In the evaporator, high pressure liquid is evaporated through an expansion valve (not shown) thereby providing a source of cooling for delivery to the passenger compartment of the vehichle (not shown). The refrigerant leaves the evaporator 95 in the form of a low pressure gas through line 96, which is connected to refrigerant inlet 32 of the unit 10. The function of the unit 10 in the air conditioning system 82, is to remove any residual moisture from the Freon gas and to vaporize any residual liquid that might be entrained in the gas that exits the evaporator 95.

This is preferably accomplished with the unit of the type shown and described with reference to FIG. 1, wherein the fuel inlets 26 and 28 are connected to the fuel supply system 84. In the fuel supply system 84, a fuel tank 98 is fluidly connected to a fuel injection subsystem 100 which typically includes a fuel injectoin pump and regulator (not shown), for injecting pulses of fuel through line 102 to the cyclinders of engine 104. As is well known in the art, some of the fuel associated with the fuel injection subsystem 100, is normally retured to the fuel tank 98. This fuel typically experiences a temperature rise of 25–80 degrees F. upon its return to the fuel tank 98. In accordance with the illustrated embodiment of the invention, the portion 106 of the return line from the fuel injection subsystem 100 is connected at its downstream end to the fuel inlet fitting 26 of unit 10, and the portion 108 of the fuel return line that is connected at its downstream end to fuel tank 98, is fluidly connected at its upstream end to the fuel outlet fitting 28 of unit 10.

Figure 3:
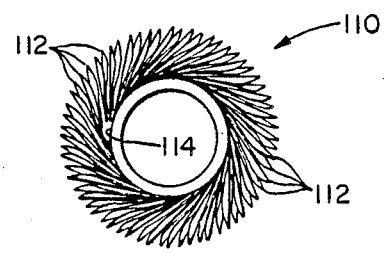
FIG. 3 is an end view of an alternative embodiment of the heat exchanger element within the combination unit.

FIG. 3 shows an alternative embodiment 110 of the heat exchanger 36 shown in FIG. 1. In this embodiment, the exterior projections are in the form of a multiplicity of spikes 112 which project obliquely, i.e., nearly tangentially, from the cylindrical wall outer surface 114.

Figure 4:
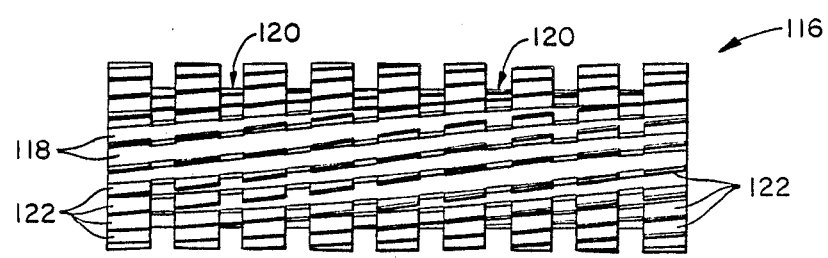
FIG. 4 is a side view of a third embodiment of the heat exchanger element within the combination unit.
Figure 5:
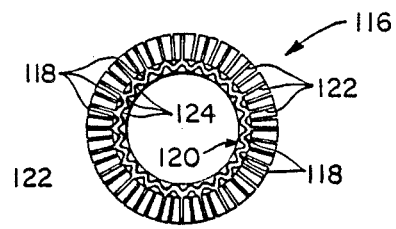
FIG. 5 is an end view of the heat exchanger embodiment shown in FIG. 4.

FIGS. 4 and 5 shown another heat exchanger embodiment 116, which has axially extending, helical grooves 118 along the cylindrical wall outer surface 120, and a plurality of circumferentially and longitudinally spaced-apart fins or splines 122 projecting from the outer surface 120. Preferably, the splines are grouped in longitudinally spaced-apart segmented rings as shown in FIG. 4. The cylinder wall inner surface 124 can also be helically grooved.

In general, the outer surfaces of the heat exchangers 56, 110, 116 are adapted to generate turbulence and present a high contact area for heat transfer to the Freon. Extruded aluminum is a suitable material for the heat exchanger element.

It can be thus appreciated that in accordance with the present invention, the fuel recirculated through lines 106, 108 is cooled in unit 10 and thus does not contribute to excessive heating and consequent temperature rise in fuel tank 98. Moreover, the heat extracted from the recirculating fuel in unit 10, is usefully employed for the purpose of evaporating residual liquid in the discharge line 96 from evaporator 95.

We claim:

1. A combination air conditioning accumulator and fuel cooler unit comprising:
   an enclosed housing having a fuel inlet and outlet, and a refrigerant inlet and outlet, said housing including a cylindrical casing and a plug member at each end of the casing, each plug member having a fuel flow bore coaxially aligned with the casing and a refrigerant flow bore at a location radially spaced from a respective fuel flow bore;

fuel flow means within the housing, for confining a flow of hot fuel from the fuel inlet to the fuel outlet;

heat exchanger means in intimate contact with the fuel flow means within the housing, for drawing heat away from the flowing fuel;

each said plug member including a neck portion projecting axially inwardly, each neck portion having a radially inner portion into which said fuel flow means is secured, and a radially outer portion onto which said heat exchanger means is secured;

means defining a refrigerant flow path from the refrigerant inlet to the refrigerant outlet, said refrigerant flow path passing along said heat exchange means so that the refrigerant absorbs the heat drawn from the flowing fuel, whereby liquid refrigerant entering the unit is evaporated before leaving the unit.

2. The unit of claim 1, wherein the housing includes an elongated cylindrical casing and the fuel flow means is coaxially aligned with the longitudinal axis of the casing.

3. The unit of claim 2, wherein the fuel flow means includes a substantially solid, rod-like stem portion and the heat exchanger means include a substantially cylindrical wall coaxially spaced from said stem portion, thereby defining an annulus through which the fuel passes and transfers heat to said wall.

4. The unit of claim 3 further including means interposed between the stem portion and the wall, for conducting heat between the stem and the wall, and for defining a helical flow path for the hot fuel around said stem.

5. The unit of claim 1 wherein the heat exchanger means includes an inner wall portion in contact with the hot fuel, and an outer, finned portion in contact with the flow of refrigerant.

6. The unit of claim 5, wherein the finned portion includes a plurality of annular fins project obliquely toward the refrigerant inlet.

7. The unit of claim 5, wherein the finned portion includes a multiplicity of spines.

8. The unit of claim 5, wherein the heat exchanger is generally cylindrical and includes an outer wall having a plurality of circumferentially spaced apart, longitudinally extending fins.

9. The unit of claim 8, wherein the outer wall is grooved and each longitudinally extending fin is segmented.

10. The unit of claim 1, further including means for insulating the casing from the flow of refrigerant.

11. The unit of claim 10 wherein the means for insulating also serves as a desiccant.

12. The unit of claim 1, wherein the fuel flow means includes
a substantially solid, rod-like stem having a first projecting end secured within one neck portion and another projecting end secured within another neck portion, one of the projecting ends having an axial bore in fluid communication with the fuel inlet and the other projecting end having an axial bore in fluid communication with the fuel outlet, and respective first and second transverse bores for directing the flow of hot fuel from one of the projecting ends to the outer surface of the stem and into the other projecting end.

13. The unit of claim 1, further including channel means extending longitudinally adjacent to the casing, having one end adjacent the refrigerant inlet for receiving evaporated refrigerant and another end in fluid communication with the refrigerant outlet.

14. The unit of claim 5, wherein the finned portion includes a multiplicity of projecting spikes.

15. In a vehicle powered by an internal combustion engine, the vehicle having a liquid fuel system including a fuel injection subsystem and a fuel supply tank and an air conditioning system, the improvement comprising a heat exchanger unit fluidly connected between the fuel system and the air conditioning system, for cooling a portion of the fuel in the fuel system by heat transfer to the air conditioning system wherein the heat exchanger functions as an accumulator and receiver in the air conditioning system, and wherein the fuel enters the heat exchanger from the fuel injection subsystem and is delivered from the heat exchanger to the fuel tank.

16. A combination air conditioning accumulator and fuel cooler unit comprising:
an enclosed housing having a fuel inlet and outlet, a casing and a refrigerant inlet and outlet;

fuel flow means within the housing, for confining a flow of hot fuel from the fuel inlet to the fuel outlet;

heat exchanger means in intimate contact with the fuel flow means within the housing, for drawing heat away from the flowing fuel;

means defining a refrigerant flow path from the refrigerant inlet to the refrigerant outlet, said refrigerant flow path passing along said heat exchange means so that the refrigerant absorbs the heat drawn from the flowing fuel;

means for insulating the casing from the flow of refrigerant, said insulating means also serving as a desiccant, whereby liquid refrigerant entering the unit is evaporated before leaving the unit.

17. A combination air conditioning accumulator and fuel cooler unit comprising:
an enclosed housing having a fuel inlet and outlet, and a refrigerant inlet and outlet, said housing including a cylindrical casing and a plug member at each end of the casing, each plug member having a fuel flow bore coaxially aligned with the casing and a refrigerant flow bore at a location radially spaced from a respective fuel flow bore, the fuel outlet plug member including a funnel-like flow skirt in fluid communication with the refrigerant inlet and adapted to distribute refrigerant substantially radially uniformly inwardly toward the heat exchanger means;

fuel flow means within the housing, for confining a flow of hot fuel from the fuel inlet to the fuel outlet;

heat exchanger means in intimate contact with the fuel flow means within the housing, for drawing heat away from the flowing fuel;

means defining a refrigerant flow path from the refrigerant inlet to the refrigerant outlet, said refrigerant flow path passing along said heat exchange means so that the refrigerant absorbs the heat drawn from the flowing fuel;

whereby liquid refrigerant entering the unit is evaporated before leaving the unit.

18. A combination air conditioning accumulator and fuel cooler unit comprising:
   an enclosed housing having a fuel inlet and outlet, and a refrigerant inlet and outlet, said housing including a cylindrical casing and a plug member at each end of the casing, each plug member having a fuel flow bore coaxially aligned with the casing and a refrigerant flow bore at a location radially spaced from a respective fuel flow bore, each end plug having an axially outer portion having an outer diameter substantially equal to the casing inner diameter and an axially inner neck portion having a smaller diameter than the outer diameter;
   fuel flow means within the housing, for confining a flow of hot fuel from the fuel inlet to the fuel outlet;
   heat exchanger means in intimate contact with the fuel flow means within the housing, for drawing heat away from the flowing fuel;
   means defining a refrigerant flow path from the refrigerant inlet to the refrigerant outlet, said refrigerant flow path passing along said heat exchange means so that the refrigerant absorbs the heat drawn from the flowing fuel;
   whereby liquid refrigerant entering the unit is evaporated before leaving the unit.

19. The unit of claim 18, wherein the casing is connected to the axially outer portion of the end plugs and the heat exchanger means is connected to axially inner portion of the end plugs, by crimping.

* * * * *